(12) United States Patent
Murgai et al.

(10) Patent No.: US 12,089,032 B1
(45) Date of Patent: Sep. 10, 2024

(54) ESTIMATING ROOM ACOUSTIC MATERIAL PROPERTIES

(71) Applicant: Apple Inc., Cupertino, CA (US)

(72) Inventors: Prateek Murgai, Palo Alto, CA (US); Jonathan D. Sheaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 608 days.

(21) Appl. No.: 17/308,778

(22) Filed: May 5, 2021

Related U.S. Application Data (60) Provisional application No. 63/059,751, filed on Jul. 31, 2020.

(51) Int. Cl.
| | |
|---|---|
| *G01H 7/00* | (2006.01) |
| *G10L 21/0216* | (2013.01) |
| *H04R 3/00* | (2006.01) |
| *H04S 7/00* | (2006.01) |

(52) U.S. Cl.
CPC .............. *H04S 7/305* (2013.01); *G01H 7/00* (2013.01); *G10L 21/0216* (2013.01); *H04R 3/005* (2013.01); *G10L 2021/02166* (2013.01); *H04R 2203/12* (2013.01)

(58) Field of Classification Search
USPC .......................................................... 73/586
See application file for complete search history.

(56) References Cited

U.S. PATENT DOCUMENTS

| | | | | |
|---|---|---|---|---|
| 3,270,833 | A  * | 9/1966 | Schroeder ................ | G01H 7/00 73/586 |
| 4,389,892 | A  * | 6/1983 | Niimi ....................... | G01H 7/00 73/586 |
| 9,479,867 | B2 * | 10/2016 | Li ........................... | H04R 3/005 |
| 9,581,530 | B2 * | 2/2017 | Guthrie ................... | G01N 29/42 |
| 10,187,740 | B2 | 1/2019 | Family | |
| 10,388,268 | B2 | 8/2019 | Leppanen et al. | |
| 10,455,325 | B2 * | 10/2019 | Woodruff ................. | G06N 3/08 |
| 10,582,299 | B1 * | 3/2020 | Mansour ................. | H04R 3/005 |

(Continued)

FOREIGN PATENT DOCUMENTS

| | | | | |
|---|---|---|---|---|
| CA | 2628524 C | * | 2/2014 | ............ H03G 3/32 |
| EP | 2930954 A1 | | 10/2015 | |

(Continued)

OTHER PUBLICATIONS

Murgai, Prateek, et al., "Blind Estimation of the Reverberation Fingerprint of Unknown Acoustic Environments," Audio Engineering Society Convention Paper 9905, Oct. 18, 2017, 6 pages.

(Continued)

*Primary Examiner* — Clayton E. LaBalle
*Assistant Examiner* — Warren K Fenwick
(74) *Attorney, Agent, or Firm* — Aikin & Gallant, LLP (57) ABSTRACT

Acoustic pickup beams (sound beams) can be formed in a physical environment from a plurality of microphone signals. Each of the sound beams can measure acoustic energy in a direction of the respective sound beam. Directional decay of the acoustic energy measured through each of the sound beams is determined. Room surface acoustic properties of the physical environment are determined based on mapping the directional decay of the acoustic energy to the physical environment. Other aspects are described and claimed.

19 Claims, 5 Drawing Sheets

(56) References Cited

U.S. PATENT DOCUMENTS

| | | |
|---|---|---|
| 10,921,446 B2 * | 2/2021 | Sipko .................. G01S 15/89 |
| 2012/0101609 A1 | 4/2012 | Supper et al. |
| 2013/0272527 A1 | 10/2013 | Oomen et al. |
| 2015/0163593 A1 * | 6/2015 | Florencio .............. H04R 3/002 |
| | | 381/92 |
| 2015/0373477 A1 | 12/2015 | Norris et al. |
| 2016/0109284 A1 * | 4/2016 | Hammershøi ........... G01H 7/00 |
| | | 73/586 |
| 2018/0197551 A1 | 7/2018 | McDowell et al. |
| 2020/0225344 A1 * | 7/2020 | Yoon ................ G01N 29/0663 |
| 2023/0062634 A1 * | 3/2023 | Murgai ................. H04R 1/406 |
| 2023/0104111 A1 | 4/2023 | Murgai et al. |

FOREIGN PATENT DOCUMENTS

| | | | | |
|---|---|---|---|---|
| WO | WO-2005032213 A1 * | 4/2005 | ............... | H04R 3/12 |
| WO | 2016109065 A1 | 7/2016 | | |
| WO | 2020197839 A1 | 10/2020 | | |
| WO | WO-2022042864 A1 * | 3/2022 | ........... | G01S 3/8083 |

OTHER PUBLICATIONS

Li, Yan, et al., "Spatial Sound Rendering Using Measured Room Impulse Responses," 2006 IEEE International Symposium on Signal Processing and Information Technology, Sep. 2006, pp. 432-437.

\* cited by examiner

ESTIMATING ROOM ACOUSTIC MATERIAL PROPERTIES

CROSS-REFERENCE TO RELATED APPLICATION

This application claims the benefit of U.S. Provisional Patent Application No. 63/059,751 filed Jul. 31, 2020, which is incorporated by reference herein in its entirety.

FIELD

One aspect of the disclosure relates to estimating room acoustic material properties.

BACKGROUND

Audio capture devices such as microphones or devices with microphones can sense sounds by converting changes in sound pressure to an electrical signal with an electro-acoustic transducer. The electrical signal can be digitized with an analog to digital converter (ADC). An acoustic beamformer can process the microphone signals to pick up sound that is concentrated at a particular location or direction.

For audio playback, sounds can be rendered with spatial filters so that they are perceived spatially. In the physical world, different environments can have a different acoustic effect on a sound source, depending on location in that environment. Sounds can be rendered spatially in an extended reality setting.

SUMMARY

Various examples of electronic systems and techniques for using such systems in relation to various extended reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Extended reality presents a challenge for augmenting virtual objects into the physical world such that the physical and the virtual blend together in a seamless fashion. An important aspect of this challenge is rendering virtual objects such that they sound as if they originate in the same acoustic space as the user. Rending the virtual object in this manner provides a realistic and immersive experience for the user. On the contrary, if the virtual object is rendered in a manner that does not resemble a sound emanating from the user's space, this can provide a disjointed and implausible audio experience.

For example, if a user is in a library and a virtual object sound is rendered as if it is coming from a cathedral, then the acoustic experience might feel less plausible to the user. To provide a realistic acoustic experience, an array of microphones in a device can be used to effectively estimate acoustic characteristics of the room in which the user is present. Such a method or system can 'learn' the acoustic properties of the room surface materials. Once these properties are known, the XR system can readily render virtual objects to sound as if they were present in the same acoustic space as the user. The system and method estimate these surface acoustic properties by detecting and analyzing sound decays coming from different directions using spatial filters (e.g., beamformers) through a multi-microphone signal processing approach.

Such a system can estimate acoustic properties of uniform rooms as well as non-uniform acoustic spaces where directional decay times are important in understanding surface acoustic properties. Non-uniform acoustic spaces can have very different acoustic properties depending on location of the space. For example, a wall on one side of the space may be covered in drapes, thereby giving this wall a much different absorption coefficient than the rest of the walls. A sound that emanates near this wall may sound very different to a user than a sound that emanates from a completely different side of the room.

In some aspects of the present disclosure, a method is described for estimating room acoustic material properties. The method includes forming, from a plurality of microphone signals, one or more sound beams in a physical environment, each of the one or more sound beams measuring acoustic energy in a direction of the respective sound beam. A decay of the acoustic energy measured through each of the one or more sound beams. Due to directionality of each sound beam, each decay is that measures directional acoustic energy. Thus, the decay is a directional decay of acoustic energy. Room surface acoustic properties of the physical environment are determined based on mapping the directional decay of the acoustic energy to the physical environment. The room surface acoustic properties can be applied when rendering sounds spatially so that these sounds are perceived to be originating in the user's physical environment. Referring back to a previous example, if a wall is covered in drapes, then a sound that is rendered spatially to be adjacent to this wall may have less of a tail (due to high sound absorption) when compared to a sound rendered adjacent to a different wall.

In some aspects, only far-field sources contribute to the estimation properties. In such a case, because the device analyzes far-field sound source decays, the system can react quickly (e.g., in a manner of seconds) to the user moving from one acoustic space to another because the system can converge to the decay time of the new acoustic space without regard to near-field sound source decays.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

Figure 1:
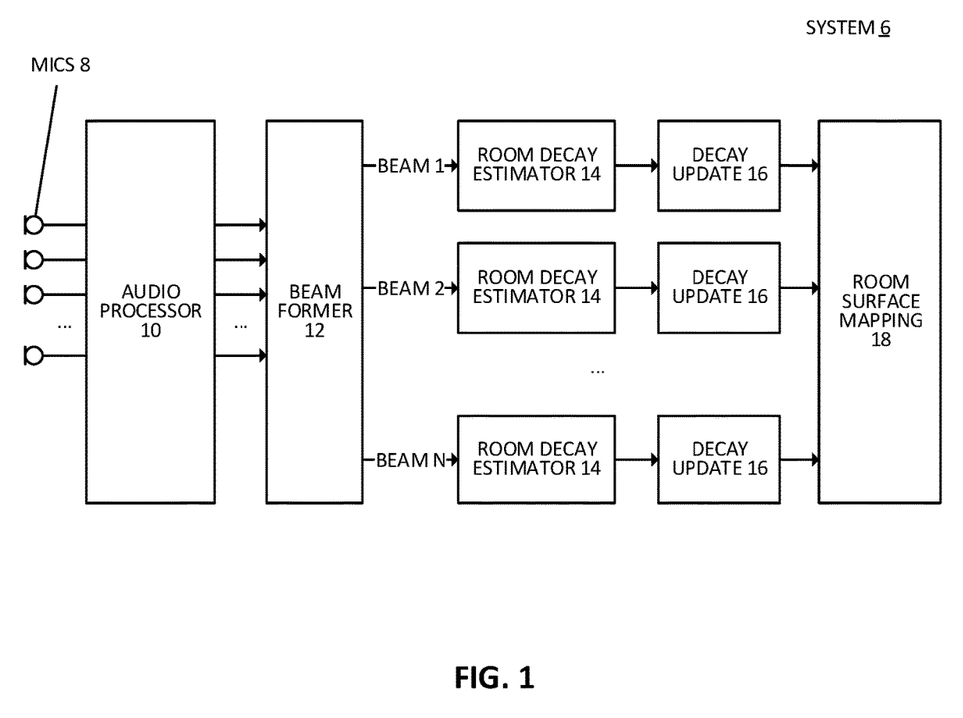
FIG. 1 illustrates a system and method for estimating room acoustic material properties, according to some aspects.

FIG. 1 shows a system and method 6 for estimating acoustic material properties of a user environment according to some aspects. The system can be an electronic device such as, for example, a tablet computer, a smart phone, a computer laptop, a speaker, a headphone, a head mounted display, a media player, smart glasses, or an electronic device for presenting XR content.

A user environment can be a space, a room, a location, an indoor setting, an outdoor setting, or a semi-enclosed space. A microphone array 8 generates a plurality of microphone signals that capture sound in the user environment. The microphones of the microphone array can have fixed and known positions. The microphone signals can contain sound energy sensed by a plurality of microphones. The microphone array can be integral to system (e.g., as a microphone array integrated with an electronic device).

An audio processor 10 can digitize the microphone signals with analog to digital converters (ADC) for further processing. The processor can perform analysis or filtering on the microphone signals, to convert each signal to a time-varying sequences (e.g., frames) containing acoustic data associated with different frequency bands (e.g., frequency bins). The system and method shown can be performed and/or updated on a per time frame basis, to repeatedly determine and update acoustic material properties. Certain aspects of the system and method can vary based on application, as described with respect to FIG. 2 and FIG. 3 in the following sections.

Figure 2:
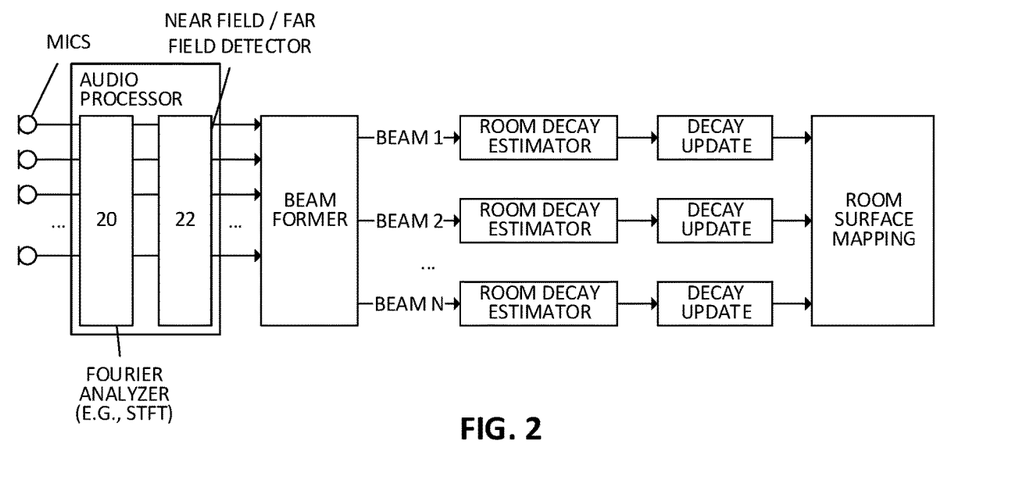
FIG. 2 and FIG. 3 illustrate a system and method for estimating room acoustic material properties with near-field and far-field detection, according to some aspects.

For example, as shown in FIG. 2, a Fourier analyzer 20 can perform Fourier analysis on the microphone signals to transform the microphone signals to frequency domain components. The analyzer can use short-time Fourier transform (STFT) to produce sequences (time-frames) of frequency domain components in different frequency bins. The input of the Fourier analyzer can be a 2D matrix of size [numMics, numSamples] where numMics is the number of microphones being used and numSamples is the number of samples in a given time frame. The output of the system is a 2D matrix of size [numMics, numFrequencies] where numFrequencies is the number of frequency bins.

Figure 3:
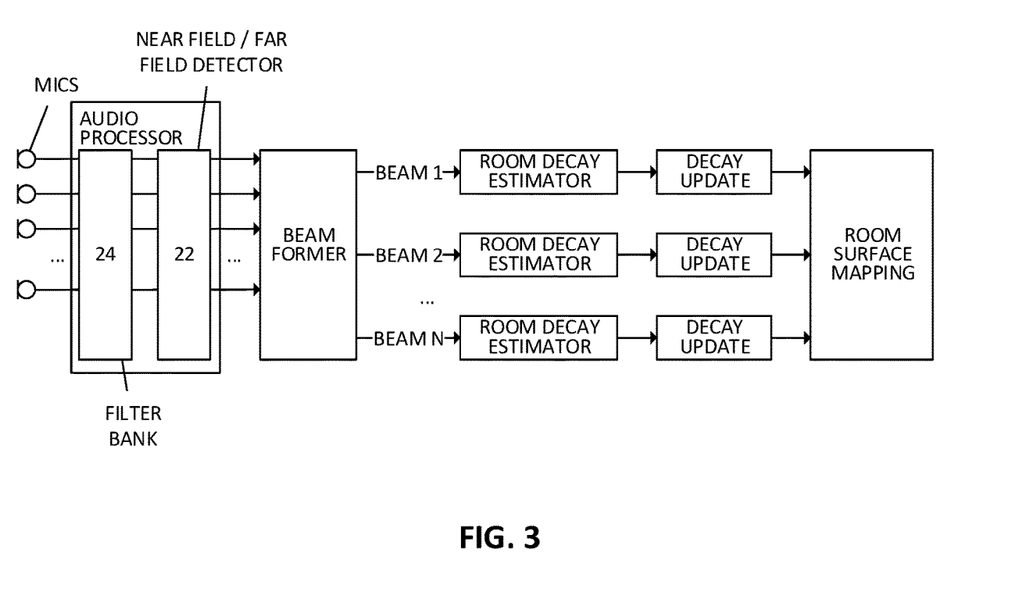

Alternatively, as shown in FIG. 3, filter banks 24 can be applied to each of the microphone signals to extract from each signal a plurality of time-domain signals, each in different frequency bands, the range of each frequency band being dependent on design of each of the filters in the filter bank. Regardless of whether the Fourier analyzer 20 (in FIG. 2) or the filter bank 24 (in FIG. 3) are implemented, both approaches result in extracting from each of the microphones, time-varying sequences (e.g., frames) containing acoustic data associated with different frequency bands.

In some aspects, near-field acoustic energy is removed or ignored in the determination of the room surface acoustic properties of the physical environment. A near-field/far-field detector 22 can apply a direction of arrival algorithm to the sub-bands extracted at blocks 20 or 24 using near-field impulse responses and far-field impulse responses to detect presence of near-field or far-field sound sources in each frequency bin or frequency band. This block can classify whether a frame of a frequency bin or band of interest is dominated by a near-field or far-field source.

It is appreciated that the estimation of directional acoustic decay can be thrown off when a near-field source (e.g., the user's own voice) is present. Near-field sounds can lead to convergence onto incorrect room decay times due to the strong acoustic signatures of such sources. Frequency bins/bands where the near-field source is detected as dominant can be discarded so that the pickup beams formed by the beamformer do not contain near-field sound components. These pickup beams, having reduced near-field components, can be used to analyze far-field sound decays in different directions.

Referring back to FIG. 1, a beamformer 12 forms one or more sound beams in the user's physical environment. Each of the one or more sound beams, which are pickup beams, measures acoustic energy in a direction of the respective sound beam. Sound beams can be formed, for example, by applying spatial filters that define frequency shifts and gains to the microphone signals.

Figure 4:
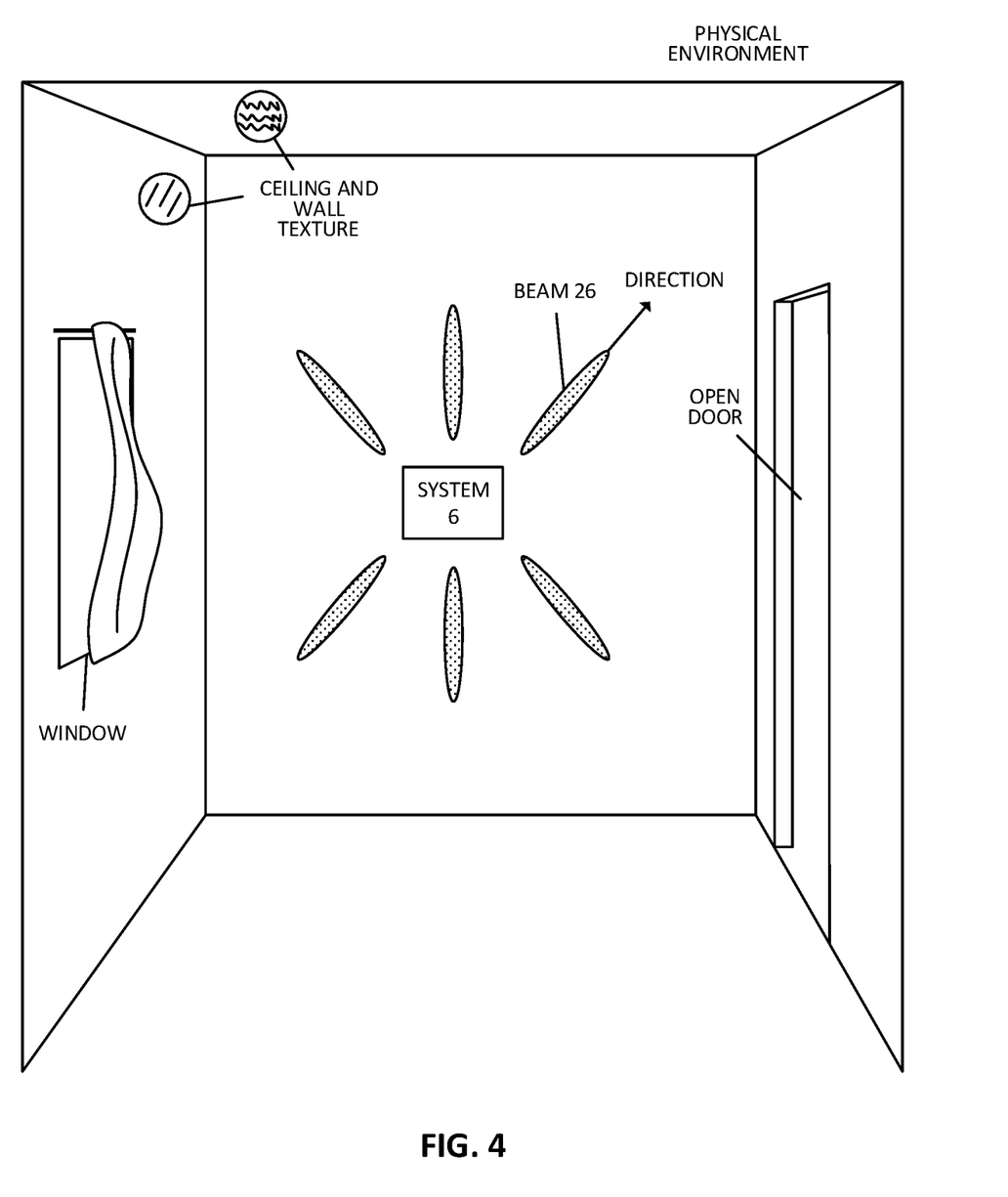
FIG. 4 illustrates a system for estimating room acoustic material properties in a physical environment, according to some aspects.

The acoustic pickup beams are used to listen and analyze sound energy in particular directions. For example, FIG. 4 shows one or more beams 26 formed such that they are pointing towards different room surfaces. Each beam can be associated with a particular direction. The pattern of the beams, including directionality (which can be used describe how wide or narrow the beam is) and direction of each beam, can be controlled based on coefficients of the spatial filters, and these properties can vary depending on application. Similarly, the number of beams deployed can vary depending on application, e.g., based on how many microphones are in the microphone array, or how fast the system can process audio data. As the number of beams increases, resolution of measured decay can increase, however, the computational load of the system also increases. In some aspects, the number of beams ranges from 5 beams to 20 beams, or 7 beams to 10 beams. The beams can be spaced and arranged in three dimensional space to maximize coverage in the user environment. By pointing beams towards the room surfaces the system can analyze how the sound sources (e.g., far-field sources) decay through their interaction with room surfaces. In some aspects, the beams can adapt dynamically, such that they need not be fixed to a particular position in space. For example, during a given application beams can be adapted (e.g., changing shape and/or direction) and/or new beams can be added. The beams can be focused on one or more surfaces of interest (e.g., a wall, furniture, etc.) at a given direction to sense room information as desired.

Referring back to FIG. 1, directional decay of the acoustic energy measured through each of the sound beams can be determined at blocks 14 and 16. Directional decay is a measure of how the acoustic energy in each of the one or more sound beams decays over time. Each of the one or more sound beams has a direction, thus the acoustic energy picked up by each beam represents a directional acoustic energy that can be stated as a sound pressure level or Decibel. The decay of this acoustic energy over time is thus a directional decay of the measured acoustic energy.

At room decay estimator 14, the directional decay associated with each of the one or more sound beams can be determined by measuring acoustic energy of each of the one or more sound beams at one or more intervals, and fitting a sound decay model to the measured acoustic energy (e.g., an intermittent sound decay identified therein) at the one or more intervals in a current audio frame. The sound decay model represents how acoustic energy decays in the direction of the respective sound beam.

For example, the room decay estimator 14 samples the acoustic energy at one or more intervals in a, picked up in each of the beams to determine the 'true' sound decay as measured, in a current audio frame. This sampling can be performed per frequency band. Thus, directional decay can be determined as a time varying directional decay on a per frequency band basis, per audio frame. For each frame (which can include multiple samples), decay times for different frequency bands (e.g., each frequency bin or sub-band) are estimated for each of the one or more sound beams.

For the sound decay estimation, intermittent sound decays can be identified in the extracted beamformed data by checking for multiple conditions on the value and energy of samples at the one or more intervals in a current audio frame. Intermittent sound decays include any decays in sound that occur in an acoustic space over time. These decays can include decays in voice (e.g., when a person is talking) or of sound arising from any acoustic events like slamming doors, music playing through a speaker in a room, bouncing balls, and more. In some aspects, conditions that are checked can include energy of each sub-frame within a given frame. Energy of consecutive neighboring subframes can be compared to determine relationships between the subframes and how energy is decaying in those subframes (e.g., relative to neighboring subframes). In some aspects, transients (e.g., sharp increases or decreases in acoustic energy) are detected, e.g., between consecutive neighboring subframes. In some aspects, checking for multiple conditions includes determining if the maximum/minimum value within a given sub-frame is greater than or less than the maximum/minimum values of the consecutive neighboring sub-frames. The identified sound decays represent the true sound decay. Acoustic energy can be a measurement of sound pressure level, expressed in dB or other known units. Once the spatially-filtered time-frequency information has been identified, this system performs sound decay estimation and sound decay modeling.

Figure 5:
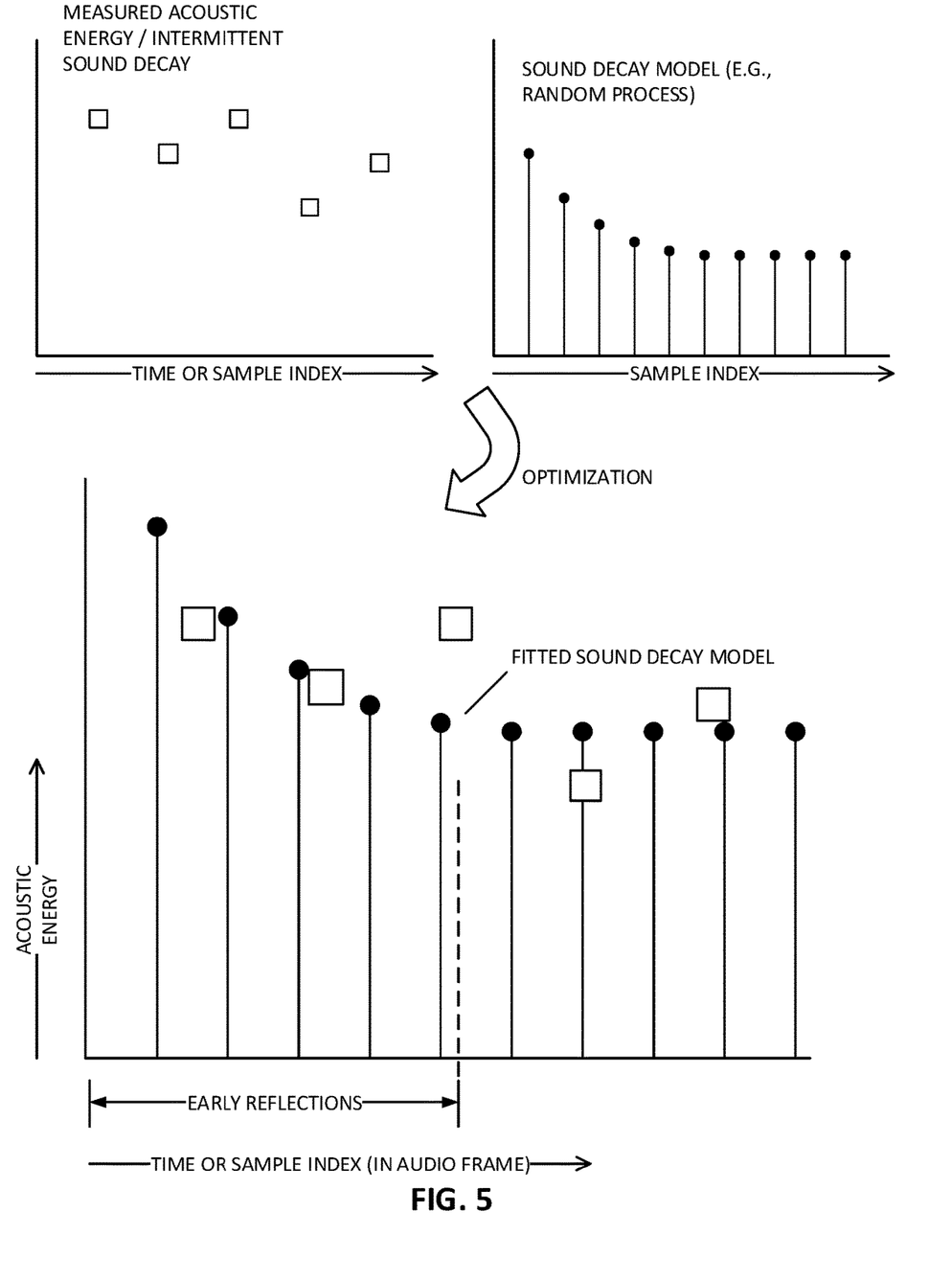
FIG. 5 shows directional acoustic decay estimation, according to some aspects.

As shown in FIG. 5, the intermittent sound decays can be modeled as a curve, function, and/or a discrete random process. Each intermittent decay can be modeled as a straight line, an exponential decay, or other function that describes a rate of decay. A decay time can be a time in which the acoustic energy reduces a predetermined amount, such as, for example, 10 dB, 20 dB, 40 dB, 60 dB, or 80 dB. In some aspects, each of the intermittent sound decays are modeled as a discrete random process with decay time as the parameter controlling the decay of the discrete random process.

An optimization algorithm is performed that estimates a decay time for which the error (e.g., a difference) between the measured sound decay (e.g., an intermittent sound decay) and the sound decay model is minimized. The optimization algorithm can include, for example, stochastic approximation, gradient descent, perturbation, or other known optimization methods.

This estimated decay time, for which the error between the measured sound decay and the model is minimized, can be calculated for each sub-band of interest in each beam, per audio frame. As described, if near-field sound sources have been removed, then only far-field sound sources are modeled. The estimated sound decay then describes sound decay of far-field sound sources, while filtering out the effect of near-field sound sources, thus providing an improved estimation of surface material properties in the user environment.

In some aspects, the directional decay of each of the one or more sound beams is determined based on early reflections sensed in the plurality of microphone signals. For example, in FIG. 5, the acoustic model is shown fitted to the measured acoustic energy decay. Early reflections can include acoustic energy of the sound source from inception of the sound to a predefined period of time (e.g., 30 ms). Early reflections can provide direct copies of the original sound source, rather than diffuse mixtures as are present in the late reflections, or reverberation. Thus, early reflections can provide more accurate estimations of room acoustic material properties of a particular surface, because late reflections or reverberations can include acoustic energy that has bounced off of many different surfaces.

Once room decay times in different frequency bands have been estimated at block 14, the values are passed onto the update block 16 which maintains a pool of current and previous decay times. At decay update block 16, analysis of previously determined directional decay (from previous audio frames) are used establish confidence in the directional decay that is estimated at block 14 based on the current audio frame. Confidence that the system has estimated the correct decay times of the given acoustic space is difficult to establish by analyzing a single sound source decay. For this very reason the system can repeatedly analyze sound source decays and create sub-pools and histograms of estimated decay times.

As previously described, the sound source decays can be free from near-field sound source decays, focusing on the far-field sound source decays. The previously estimated decay times (for example, those determined only based on far-field sound source) can be stored in a histogram and compared to the current estimate to determine confidence in the decay estimate. In a matter of seconds (which can be tens, hundreds, or thousands of processed audio frames) the system can build confidence by looking at the most populated sub-pools of decay times and the most frequent decay times in the histogram.

For example, if the currently estimated decay time for a particular sub-band varies greatly from previously stored decay times in the same sub-band, then this currently estimated decay time can be discarded, or assigned a low weight. On the other hand, if the currently estimated decay time has a value that is similar to other previous decay times (and is a frequent decay time in the histogram), this agreement between the current and previously estimated decay times can increase confidence in the validity of the currently estimated decay time. Thus, confidence levels can be determined for each decay time based on previously estimated decay times. Currently estimated decay times can also be stored and referenced in future processing of future audio frames.

The system can assign confidence levels to each estimate and only use decay times that exceed a threshold confidence level. In some aspects, only the decay times that exceed the threshold confidence level are used to determine the room acoustic material properties at block 18. Furthermore, based on the stored decay times, if a user moves from acoustic space to another, the system can converge onto the new room decay time very quickly, by using the stored decay times, without having to start from scratch.

Once the directional frequency dependent decay times have been estimated, the room surface mapping block 18 maps the decay times to room surface acoustic properties. The derived properties can also provide some idea about what the physical material is at different locations and directions of the user environment. Room surface acoustic properties of the physical environment can include, for example, absorption, scattering, and/or surface material. Each of these properties can be associated with a direction or location in the physical environment.

For example, FIG. 4 shows a system 6 that generates a number of beams 26 in directions radially originating from the system. As mentioned, each room surface acoustic property can also include (or be associated with) a location in the physical environment, or a direction relative to the system. Different directions and locations can have or be associated with unique values of surface acoustic properties. Surface acoustic properties can include sound absorption, scattering, and/or surface material type.

Sound absorption can be defined as a sound absorption coefficient, that is, the ratio of absorbed sound intensity in a material to the incident sound intensity. Objects in the room (e.g., furniture) can result in different scattering and absorption of sounds. How sound is scattered can depend on the shape and geometry of the object. Thus, absorption and scattering coefficients can be determined and mapped to different directions and/or locations in the physical environment.

Directional decay can be determined, as described in the present disclosure, for those directions that each of the beams are arranged in. For example, a ceiling may have a different surface texture from a wall, thereby yielding different sound absorption coefficients. Thus, a beam directed to the ceiling would yield a different decay time than a beam directed at the wall. Similarly, a glass pane of a window, and curtains can have different sound absorption coefficients. A beam directed at the curtain can have a higher sound absorption than a beam directed at the glass pane. In some cases, a window or door can be open. In this case, a beam directed at the open door might see little or no reflected sound.

The mapping of directional decay to the physical environment can include determining absorption, scattering, or a surface material property based on the different decay rates at different frequencies in a given direction. For example, absorption values, scattering values, and/or surface material types can be referenced through a look-up table with an algorithm that relates decay times at different frequencies to a corresponding absorption value, scattering value, and/or surface material type. Such a table can be derived empirically, or theoretically. Additionally, or alternatively, other algorithms can be used to effectively estimate room surface acoustic properties based on the determined directional decay.

For example, the room surface acoustic properties can be derived based on the decay rates with a trained neural network (e.g., a deep neural network). The neural network can be trained with categorized surface material types or groupings thereof (e.g., drywall, felt, glass, wood, cloth, etc.) that are each associated with measured decay times at different frequencies. The determined decay times of the user's current physical environment can be fed as input to the trained neural network to output a material type, or a grouping material types.

The room surface acoustic properties can be associated with a direction or location associated with a corresponding pick-up beam. However, in directions or locations of the physical environment that lie between beams, decay rates can be interpolated and used to determine surface acoustic properties that are 'between the gaps'.

For example, the system can apply spherical interpolation, also known as spherical linear interpolation or SLERP, to the directional decay to interpolate decay in additional directions between the one or more sound beams. These interpolated decay values can also be mapped to the physical environment to fill in gaps between the acoustic beams.

The resulting room surface acoustic properties can be used to render sound sources to resemble sounds that emanate from the physical property. A spatial renderer can apply spatial rendering filters that model the room, including the surface acoustic properties, according to a spatial location of the sound being rendered. For example, if an audio object has a virtual location that is adjacent to a draped wall, spatial rendering filters (e.g., an impulse response) can be applied that model an absorption coefficient resembling that of a draped wall.

This virtual acoustic replica provides more detail compared to measuring acoustic decay without respect to directionality. The latter approach cannot account for different decay profiles at different directions, that may be a result of different surface materials in the room, furniture, wall textures, room geometry, and room features such as windows or open doors.

In some aspects, mapping the directional decay of each of the one or more sound beams to the room surface acoustic properties includes performing inverse ray tracing to detect surfaces in the physical environment, and associating respective room acoustic properties to the detected surfaces. Instead of matching image features/pixels across images, the inverse ray tracing reconstructs the physical environment of the user based on the estimated and/or interpolated decay values and determines the best 3D geometry and surfaces that explain the observed decay values.

Figure 6:
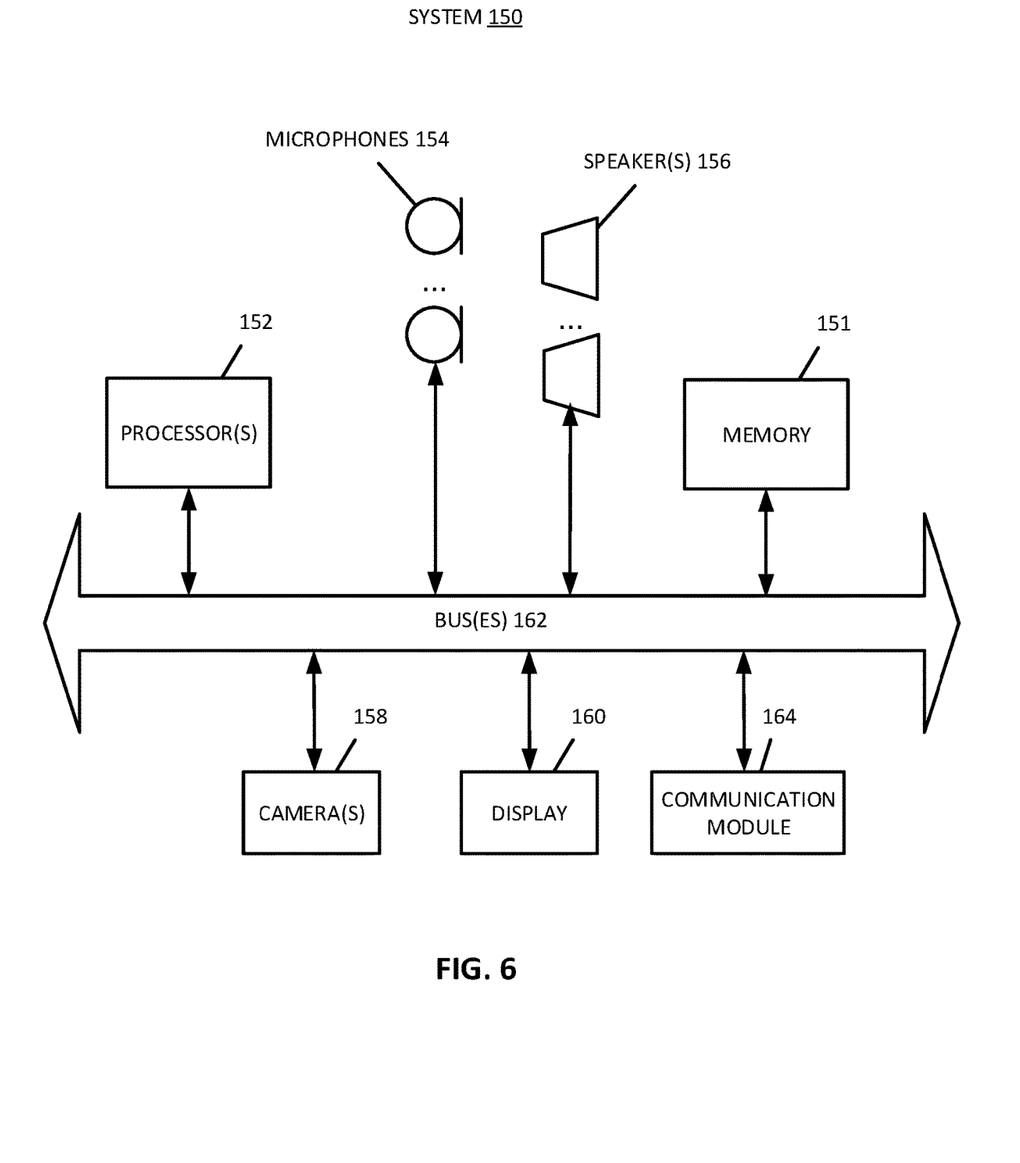
FIG. 6 illustrates an example of audio system hardware, according to some aspects.

FIG. 6 shows a block diagram of audio processing system hardware, in one aspect, which may be used with any of the aspects described. This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. In one aspect, a camera 158 and/or display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "processor", "analyzer", "renderer", "system", "device", and "component," are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logicgate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. For example, the features discussed in relation to FIG. 3 can be combined in the audio file produced in connection with FIGS. 1 and 4. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
    forming, from a plurality of microphone signals, a directional sound beam in a physical environment;
    determining directional decay of acoustic energy measured through the directional sound beam; and
    determining at least one room surface acoustic property of the physical environment based on mapping the directional decay of the acoustic energy to the physical environment, wherein the at least one room surface acoustic property is to be applied to a virtual sound source to render the virtual sound source to be perceived to be emanating in the physical environment.

2. The method of claim 1, wherein determining the directional decay includes measuring the acoustic energy of the directional sound beam at one or more intervals, and fitting a sound decay model to the measured acoustic energy at the one or more intervals, the sound decay model representing how acoustic energy decays in a direction of the directional sound beam.

3. The method of claim 1, wherein determining the directional decay includes analysis of previously determined directional decay to establish confidence in the directional decay with respect to the previously determined directional decay.

4. The method of claim 3, wherein the previously determined directional decay is organized in a histogram.

5. The method of claim 1, wherein near-field acoustic energy is removed or ignored in the determination of the at least one room surface acoustic property of the physical environment.

6. The method of claim 5, wherein removing or ignoring near-field acoustic energy includes applying a Fourier analysis or filter banks to the plurality of microphone signals and discarding resulting audio frames of sub-bands when near-field sound source is dominant, based on analysis of the audio frames of the sub-bands.

7. The method of claim 6, wherein a determination of when the near-field sound source is dominant includes applying a direction of arrival algorithm, using near-field impulse responses and far-field impulse responses, to detect presence of near-field or far-field sound sources.

8. The method of claim 1, wherein mapping the directional decay includes applying spherical interpolation to the directional decay to interpolate additional directional decay in additional directions.

9. The method of claim 1, wherein the at least one room surface acoustic property includes at least one of: an absorption parameter, a scattering parameter, and a surface material, being associated with a location, or a direction.

10. The method of claim 1, wherein the directional decay is determined based on early reflections sensed in the plurality of microphone signals.

11. The method of claim 1, wherein the directional decay includes different decay times for different frequency bands for the directional sound beam.

12. The method of claim 1, wherein mapping the directional decay includes performing inverse ray tracing to detect surfaces in the physical environment, and associating respective room acoustic properties to the detected surfaces.

13. A system comprising:
a plurality of microphones that generate a plurality of microphone signals; and
a processor configured to perform the following:
forming, from the plurality of microphone signals, a directional sound beam in a physical environment;
determining directional decay of acoustic energy measured through the directional sound beam; and
determining at least one room surface acoustic property of the physical environment based on mapping the directional decay of the acoustic energy to the physical environment, wherein the at least one room surface acoustic property is to be applied to a virtual sound source to render the virtual sound source to be perceived to be emanating in the physical environment.

14. The system of claim 13, wherein determining the directional decay includes measuring the acoustic energy of the directional sound beam at one or more intervals, and fitting a sound decay model to the measured acoustic energy, the sound decay model representing how acoustic energy decays in a direction of the directional sound beam.

15. The system of claim 13, wherein determining the directional decay includes analysis of previously determined directional decay to establish confidence in the directional decay with respect to the previously determined directional decay.

16. The system of claim 13, wherein mapping the directional decay includes performing inverse ray tracing to detect surfaces in the physical environment, and associating respective room acoustic properties to the detected surfaces.

17. An audio device, comprising:
a microphone array that generates a plurality of microphone signals; and
a processor configured to perform the following:
forming, from the plurality of microphone signals, a directional sound beam in a physical environment;
determining directional decay of acoustic energy measured through the directional sound beam; and
determining at least one room surface acoustic property of the physical environment based on mapping the directional decay of the acoustic energy to the physical environment, wherein the at least one room surface acoustic property is to be applied to a virtual sound source to render the virtual sound source to be perceived to be emanating in the physical environment.

18. The audio device of claim 17, wherein determining the directional includes measuring the acoustic energy of the directional sound beam at one or more intervals, and fitting a sound decay model to the measured acoustic energy, the sound decay model representing how acoustic energy decays in a direction of the directional sound beam.

19. The audio device of claim 17, wherein determining the directional decay includes analysis of previously determined directional decay to establish confidence in the directional decay with respect to the previously determined directional decay.

* * * * *